3,308,793
ROTARY PISTON ENGINES
Ryusuke Ito, Amagasaki-shi, Japan, assignor to Yanmar Diesel Engine Co., Ltd., Osaka, Japan, a corporation of Japan
Filed Dec. 2, 1964, Ser. No. 415,241
Claims priority, application Japan, Dec. 6, 1963, 38/91,170
1 Claim. (Cl. 123—8)

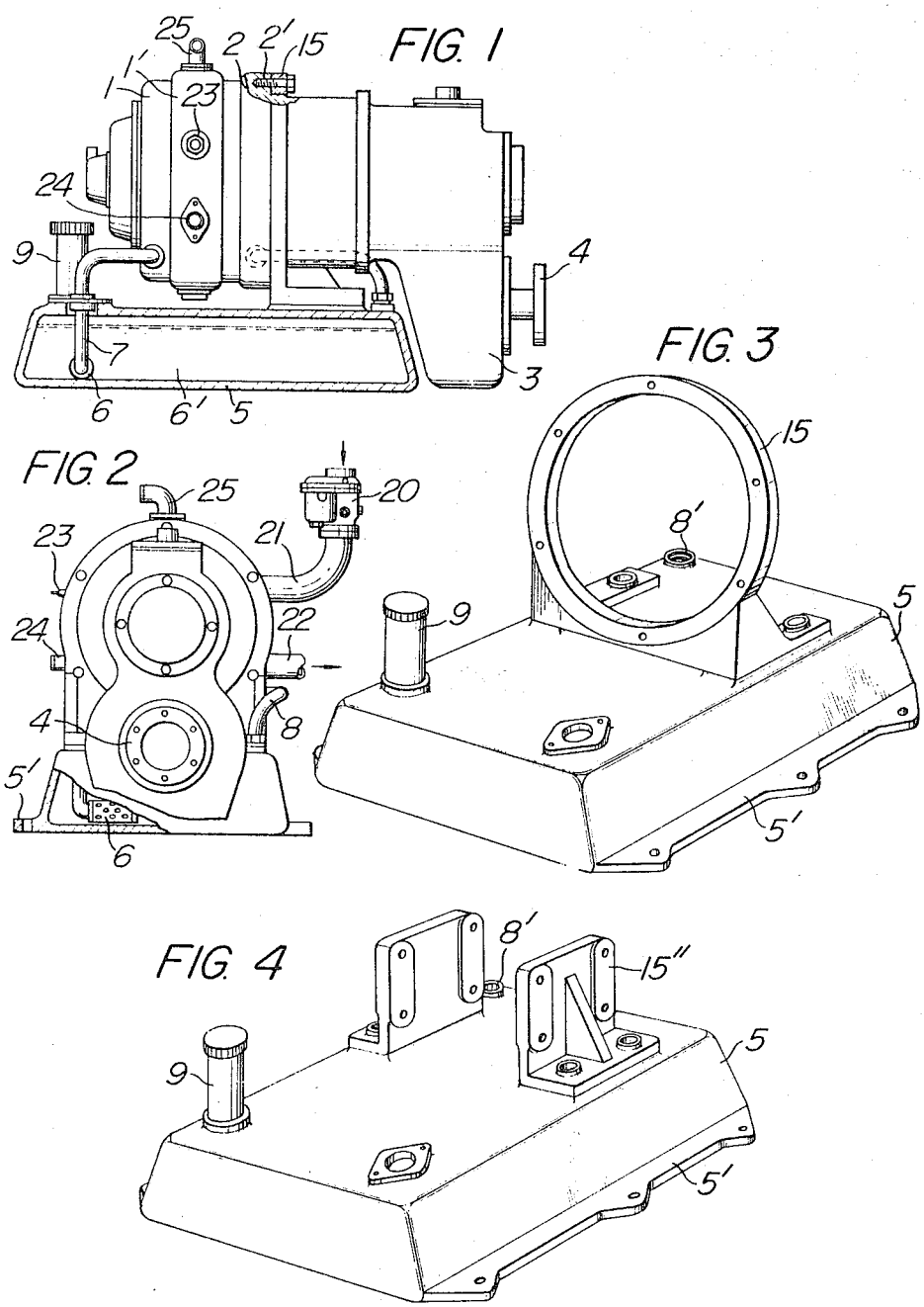

This invention relates to rotary piston engines of the known type including a casing the inner peripheral wall of which has a profile approximating an epitrochoid and a piston mounted in said casing and having apices held in sliding contact with the inner wall of the casing.

With this type of rotary piston engines, lubricant oil is usually employed to serve the dual purpose of lubricating the engine interior and cooling the piston. Such lubricant oil is forced into the engine interior by an oil pump provided for the purpose, but, after having served the lubricating and cooling purposes, the lubricant now free from any pressure is ordinarily discharged exteriorly of the engine under gravity unless a suction pump is provided for the purpose of sucking the oil out of the engine. Therefore, with rotary piston engines incorporating this ordinary lubrication system, it will be apparent that it is necessary to provide a lubricant oil reservoir in the lower portion of the engine body. Generally, with reciprocatory piston engines, an oil reservoir is arranged in the bottom portion of the engine crankcase so that the oil having served the lubricating purpose flows down under gravity into the oil reservoir, as is well known in the art. With rotary piston engines, however, it is difficult to provide an oil reservoir in the center housing of the engine, which corresponds to the cylinder block of a reciprocatory piston engine, largely because of structural reasons. It might be structurally possible to construct the center housing with an oil reservoir suspended therefrom and an oil conduit arranged to direct the discharged engine oil into the reservoir. This structure, however, would complicate the arrangement for installing the engine on a working machine or on an engine bed in a ship and would also make the engine maintenance troublesome.

To overcome these difficulties, the present invention proposes to provide a rotary piston engine with a lubricant oil tank which is adapted to be installed on a working machine or an engine bed in a ship and is formed at the top with flanges or mounting plates by means of which the engine body is secured to the oil tank.

The present invention will further be described with reference to the accompanying drawings, which illustrate one embodiment of the invention as applied to a small marine engine and in which:

FIG. 1 is a side elevation, partly in section, of a rotary piston engine for marine use embodying the present invention;

FIG. 2 is a partly cutaway front elevation of the engine;

FIG. 3 is a perspective view of the lubricant tank having an engine mounting flange; and FIG. 4 illustrates a modified form of lubricant tank having a modified engine mounting structure.

Referring to the drawings, reference numeral 1 designates the main body portion of the rotary piston engine; 1' a center housing; 2 a flywheel housing having a flange portion 2'; 3 a speed reduction and reversing clutch device and 4 a propeller shaft. Reference numeral 5 designates a lubricant tank forming the essential part of the present invention and including an oil reservoir 6', mounting feet 5' to be secured to a working machine or to an engine bed in a ship, an oil refilling port 9 and an aperture 8' to be connected with an oil discharge pipe 8 for returning oil from the engine proper to the oil reservoir 6'. Incorporated in the lubricant tank structure is an oil suction pipe 7 with an oil strainer 6 fitted thereto. The tank structure has a flange formation 15 (FIG. 1) on its top for mounting the engine proper thereon. The flange 2' on the flywheel housing of the engine is secured to the flange formation 15, as observed in FIG. 1.

Also, referring to the drawings, reference numeral 20 designates a carburetor; 21 a suction pipe; 22 an exhaust pipe; 23 an ignition plug; 24 a cooling water inlet; and 25 a cooling water outlet.

The structure on the lubricant tank for mounting the engine proper thereon may be modified for example as shown in FIG. 4. This modification includes two spaced parallel flanges 15" upstanding from the top of the tank. In this case, it will be understood that the engine proper is only required to have at appropriate points thereon mounting surfaces complemental to the flange formation 15".

What is claimed is:

In combination with a rotary piston engine of the type including a casing having an inner peripheral wall profiled approximately epitrochoidal and a piston mounted in said casing and having apices held in sliding contact with said epitrochoidal inner wall and a pair of spaced parallel mounting surfaces on said casing, a lubricating oil sump base having feet to be secured to a mounting surface, said lubricating sump base having thereon a pair of vertical parallel flanges adapted to be secured to said mounting surfaces formed on the casing, and means connecting said sump to an engine lubricating circuit.

References Cited by the Examiner
UNITED STATES PATENTS

| | | | |
|---|---|---|---|
| 729,069 | 5/1903 | Hoff | 123—16 |
| 1,354,189 | 9/1920 | Howitt et al. | 123—16 |
| 1,558,788 | 10/1925 | Campbell. | |
| 1,865,666 | 7/1932 | Aruga | 123—16 X |
| 2,450,150 | 9/1948 | McCulloch et al. | |
| 2,988,065 | 6/1961 | Wankel et al. | 123—8 |

MARK NEWMAN, *Primary Examiner.*
F. T. SADLER, *Assistant Examiner.*